(12) United States Patent
Purohit et al.

(10) Patent No.: US 12,337,646 B2
(45) Date of Patent: Jun. 24, 2025

(54) VEHICLE SUSPENSION SYSTEMS AND METHODS

(71) Applicant: Chalmers Suspensions International Inc., Mississauga (CA)

(72) Inventors: Nitin Purohit, Milton (CA); Leo Delelis, Holland Landing (CA); Gabriel Iosif, Toronto (CA)

(73) Assignee: Chalmers Suspensions International Inc., Mississauga (CA)

( * ) Notice: Subject to any disclaimer, the term of this patent is extended or adjusted under 35 U.S.C. 154(b) by 0 days.

(21) Appl. No.: 18/307,784

(22) Filed: Apr. 26, 2023

(65) Prior Publication Data

US 2024/0359516 A1     Oct. 31, 2024

(51) Int. Cl.
  *B60G 9/02*     (2006.01)
  *B60G 7/00*     (2006.01)
  *B60G 7/02*     (2006.01)
  *B60G 21/05*    (2006.01)

(52) U.S. Cl.
  CPC .............. *B60G 9/02* (2013.01); *B60G 7/001* (2013.01); *B60G 7/008* (2013.01); *B60G 7/02* (2013.01); *B60G 21/05* (2013.01); *B60G 2200/31* (2013.01); *B60G 2204/143* (2013.01); *B60G 2204/148* (2013.01); *B60G 2206/10* (2013.01); *B60G 2206/72* (2013.01)

(58) Field of Classification Search
  CPC .......... B60G 9/02; B60G 7/001; B60G 7/008; B60G 7/02; B60G 21/05; B60G 2200/31; B60G 2204/143; B60G 2204/148; B60G 2206/10; B60G 2206/72
  See application file for complete search history.

(56) References Cited

U.S. PATENT DOCUMENTS

| | | | |
|---|---|---|---|
| 2004/0188973 A1* | 9/2004 | Molitor ................ | B60G 21/051 |
| | | | 280/124.166 |
| 2006/0001311 A1* | 1/2006 | Platner ................. | B60G 21/051 |
| | | | 301/124.1 |
| 2011/0115184 A1* | 5/2011 | Johnson ................ | B60G 11/27 |
| | | | 280/124.111 |

FOREIGN PATENT DOCUMENTS

| | | | | |
|---|---|---|---|---|
| DE | 202013100881 U1 * | 5/2013 | ......... | B60G 17/0162 |
| GB | 2480519 A * | 11/2011 | ............. | B23K 20/06 |

OTHER PUBLICATIONS

DE-202013100881-U1 Machine English Translation (Year: 2013).*

* cited by examiner

*Primary Examiner* — Jason D Shanske
*Assistant Examiner* — Matthew James O'Neill
(74) *Attorney, Agent, or Firm* — Mertzlufft Law PLLC; Joshua D. Mertzlufft

(57) ABSTRACT

Vehicle suspensions and methods involving the same may implement an H-frame device. An H-frame device may include a first sideleaf, a second sideleaf, and a crossleaf. The crossleaf may extend between the first sideleaf and the second sideleaf. The sideleaves may be configured to attach to frame hangers and axle brackets of a vehicle's suspension/wheel assembly. H-frame devices may provide both wheel/axle movement control and anti-roll functionality for a vehicle's suspension system.

16 Claims, 8 Drawing Sheets

VEHICLE SUSPENSION SYSTEMS AND METHODS

BACKGROUND

Commercial vehicle suspension systems must comply with various requirements related to the system's roll stiffness. This is the case even for identical suspension types.

Commercial vehicle suspension systems—like that of any vehicle—must accomplish several mechanical functions, including (i) mass support, (ii) wheel/axle movement control, and (iii) roll control. Mass support may involve supporting the mass of the vehicle in static and dynamic conditions (e.g., including control of comfort parameters, ride heights, etc.). Wheel/axle movement control may involve controlling wheel and axle movements (e.g., variation of the axle pinion angle, lateral containment of movement, vertical oscillations, etc.). Roll control may include controlling vehicle body roll and stability under various lateral loads (e.g., inertial loads during cornering, laterally-inclined ground profiles, etc.).

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1:
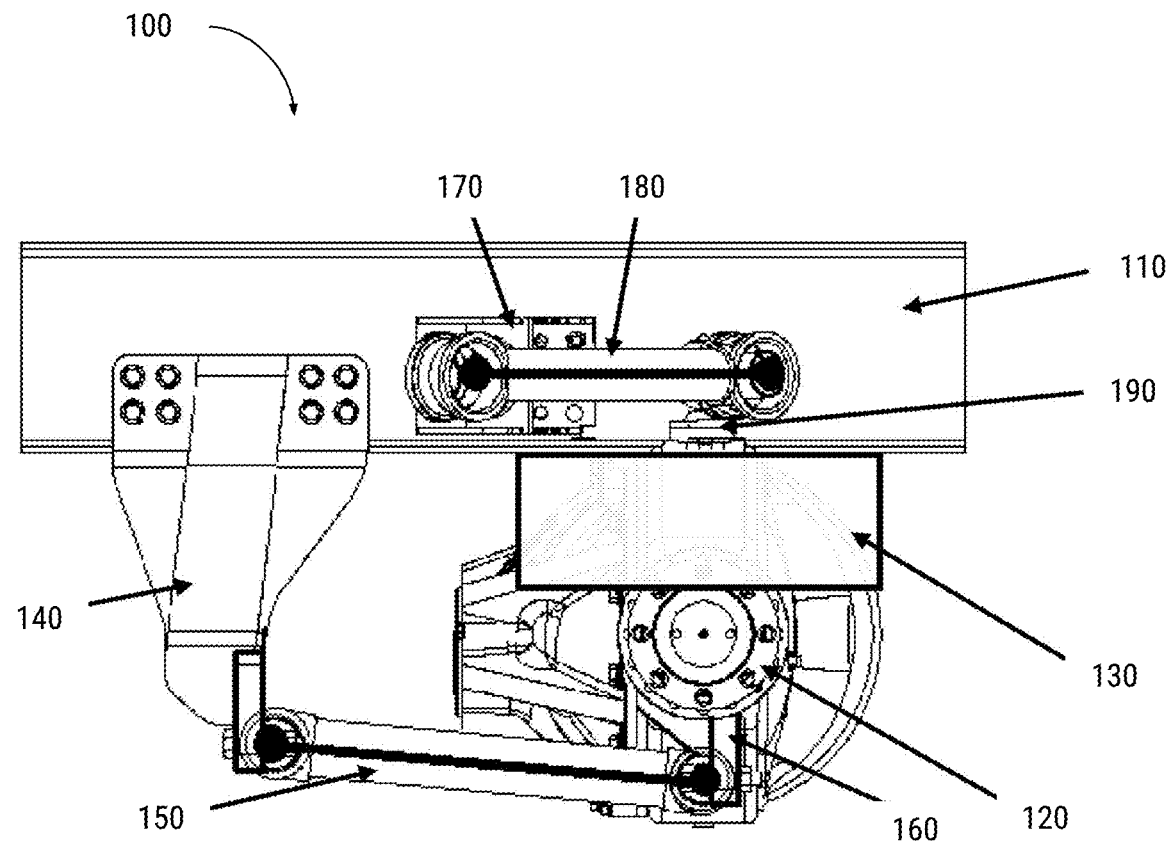
FIG. 1 illustrates an example of a conventional vehicle suspension system.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

A vehicle's ability to handle static and dynamic loads may be in part dependent upon the vehicle's suspension system's ability to provide mass support, wheel/axle movement control, and roll control.

FIG. 1 illustrates an example of a conventional vehicle suspension system 100. System 100 may include a vehicle suspension system of, for example, a rear truck suspension. It will be understood that system 100 may be applied to other vehicles and/or suspension locations.

System 100 may include a vehicle frame 110, which may comprise one or more frame rails. Vehicle frame 110 may have a frame hanger 140 and a frame bracket attached thereto. A mass support system 130 (e.g., springs or air compression devices) may be situated between an axle 120 and vehicle frame 110 so that axle 120 may support the load of the vehicle on vehicle frame 110. Axle 120 may include an axle bracket 160 and support an axle tower 190. A lower torque rod 150 (e.g., lower control arm) may connect frame hanger 140 to axle bracket 160. An upper torque rod 180 (e.g., upper control arm) may connect frame bracket 170 to axle tower 190. Present in system 100 but not visible in FIG. 1 is an anti-roll bar connecting one side of system 100 to another side of system 100.

Conventional suspension systems may provide mass support functionality by including, for example, independent springs, for example, mass support system 130 (e.g., metal, rubber, or air springs) placed between the vehicle frame (e.g., vehicle frame 110) and the axle/mobile suspension components.

Further, conventional suspension systems may provide wheel/axle movement control by, for example, an arrangement of four longitudinal (or inclined) links, such as lower torque rod 150 and upper torque rod 180 (e.g., torque rods, control arms (two upper, two lower)) arranged in a deformable quadrilateral mechanism.

Further, conventional suspension systems may provide roll control via an anti-roll bar (i.e., a sway bar). A conventional anti-roll bar may be an independent sway bar, which may be configured to pivot on frame elastic joints with articulated links to the axle. A shortcoming of this configuration may be increased complexity as more parts are required to facilitate the attachment and function of the sway bar, as well as increased weight and overall dimensions of the suspension system.

Alternatively, a conventional anti-roll bar may include a sway bar integrated with the suspension system's lower torque rods (e.g., concentric with the torque rods and frame pivots forming a u-frame). A shortcoming of this configuration may include the requirement of mechanically-complex joints between the torque rods and the sway bar. This is because conventional sway bars constructed of spring steel cannot be safely welded. A further shortcoming of this configuration is that adjustment of roll stiffness is complex and limited in range.

Implementations herein may include H-frame devices and systems and methods for implementing H-frame devices. H-frame devices, and systems and methods for implementing H-frame devices, may be implemented in vehicle suspension systems (e.g., commercial vehicle suspension systems).

Implementations herein may improve vehicle suspension systems by eliminating the need for conventional lower torque rods and conventional anti-roll devices (including adjustable-stiffness anti-roll devices. Implementations may thus provide for the combined performance of the functions of wheel/axle movement control and roll control, thus lowering complexity, weight, and costs compared to conventional suspension systems and devices. Implementations herein may further improve control of roll stiffness—and thus lateral stability—of a vehicle. Implementations herein may further enable variance of roll stiffness based on vehicle characteristics and/or type of use (e.g., the roll stiffness can be optimized based on vehicle and/or intended use characteristics), without increasing suspension system complexity, weight, or cost.

Figure 2A:
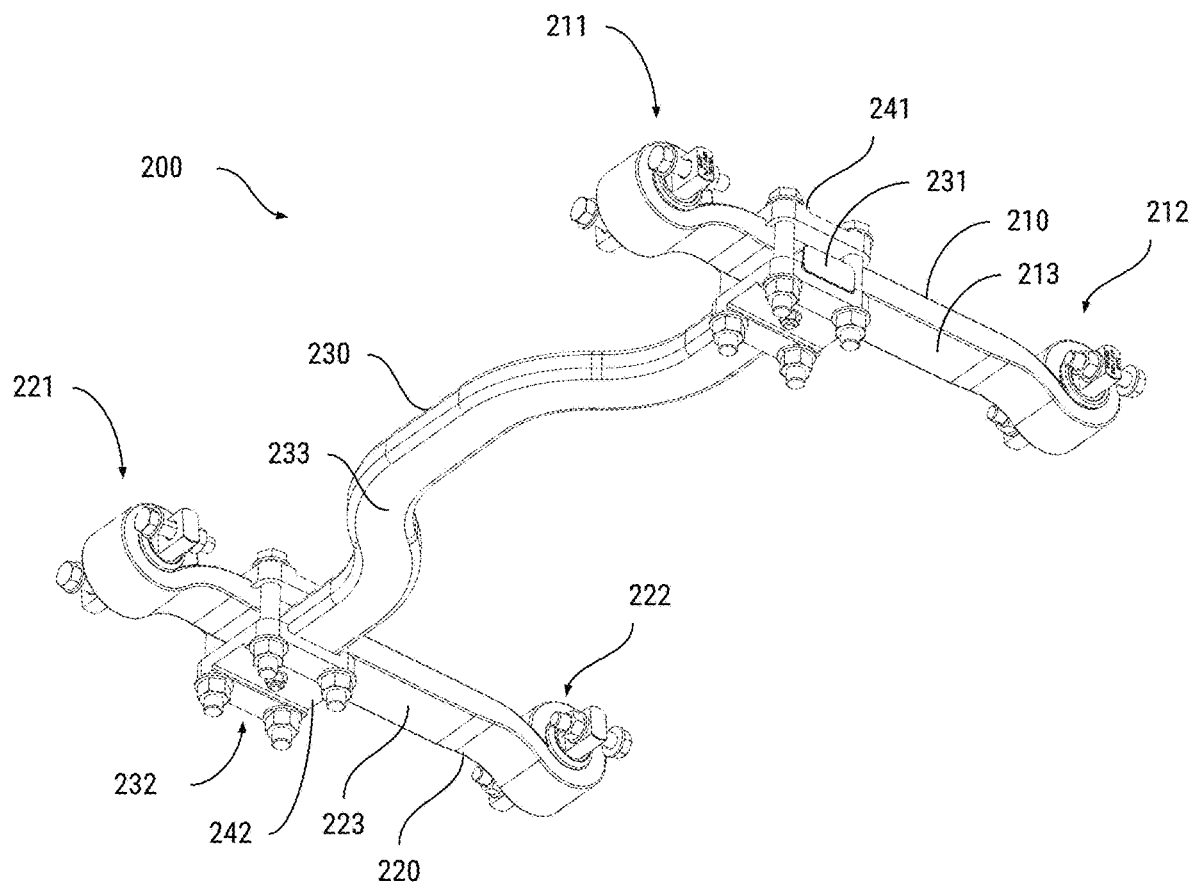
FIGS. 2A-2C illustrate examples of an H-frame device and system, according to one or more implementations.
Figure 2B:
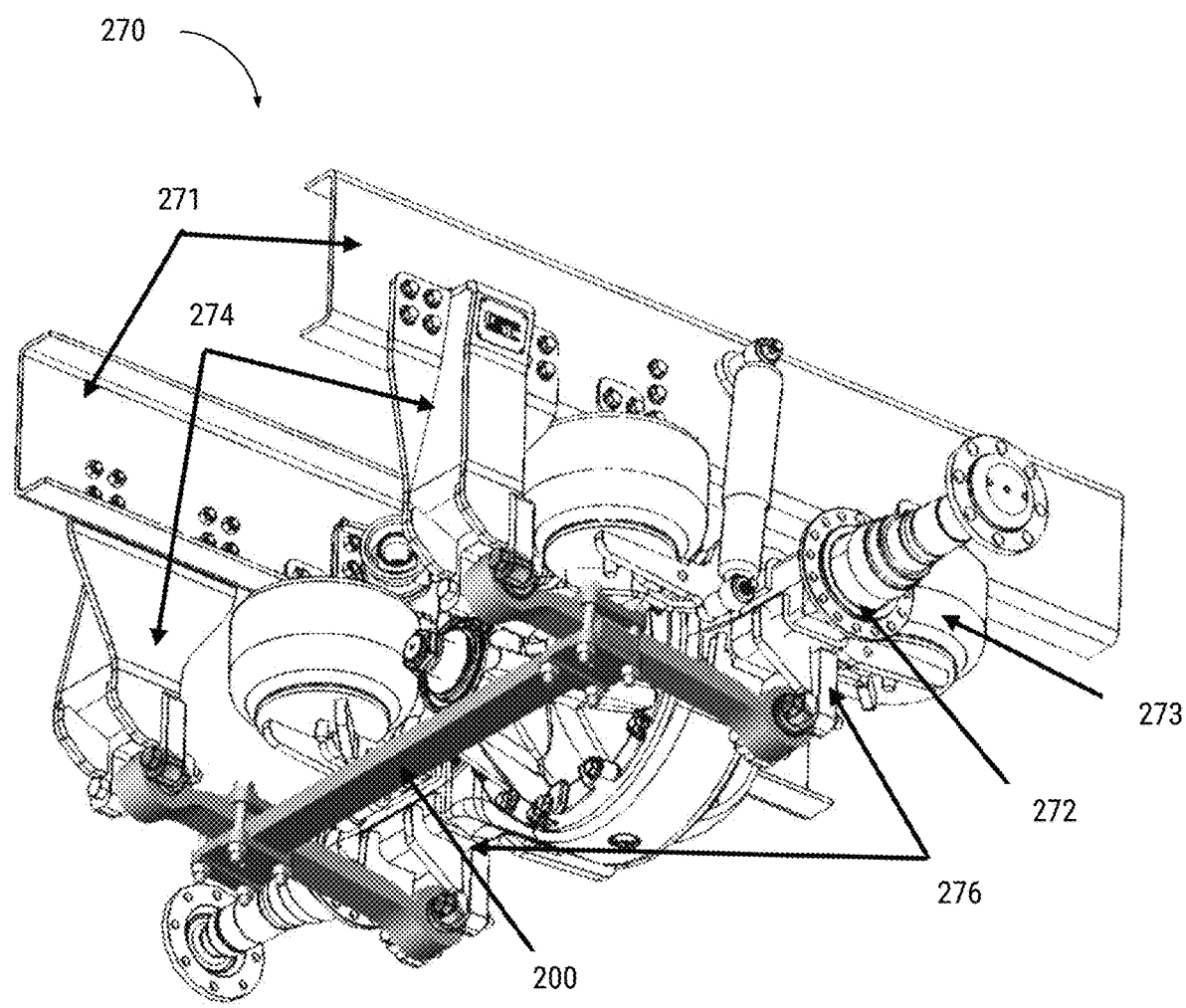
Figure 2C:
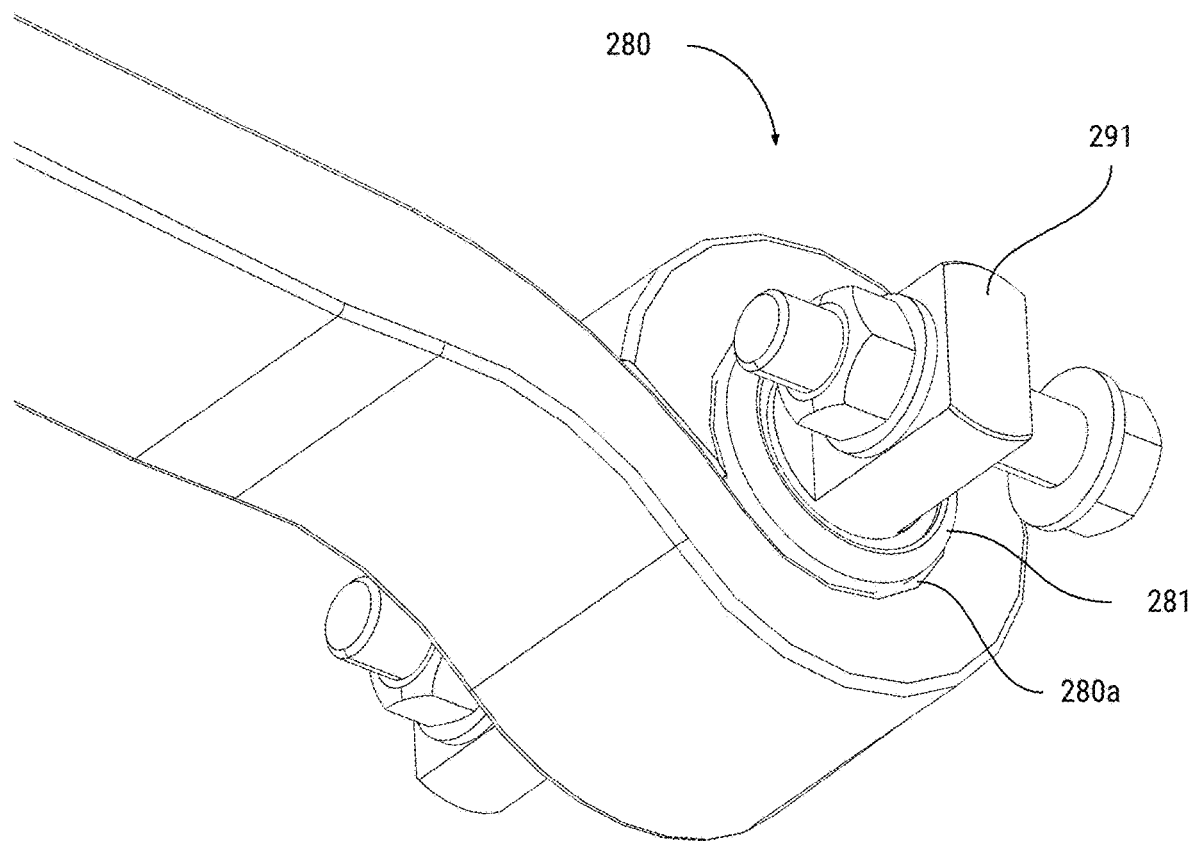

FIGS. 2A-2C illustrate examples of an H-frame device 200, according to one or more implementations. H-frame device 200 may provide for a simplified vehicle suspension system, such as suspension system 270. It will be understood that suspension system 270 is provided herein as an example for context for H-frame device 200 and is in no way limiting of the present invention.

Implementations may include device 200, which may have a first sideleaf 210, a second sideleaf 220. In some implementations, device 200 may include a crossleaf 230.

First sideleaf 210 may include a first proximal sideleaf end 211, a first distal sideleaf end 212, and a first sideleaf member 213. First sideleaf member 213 may extend from first proximal sideleaf end 211 to first distal sideleaf end 212.

First proximal sideleaf end 211, first distal sideleaf end 212, and first sideleaf member 213 may be monolithic.

First proximal sideleaf end 211 and first distal sideleaf end 212 may each include a first proximal sideleaf end eye and a first distal sideleaf end eye, respectively.

The first proximal sideleaf end eye may be configured to have a first proximal sideleaf end bushing (e.g., a polymer-metal bushing) insertably fitted thereinto. The first distal sideleaf end eye may be configured to have a first distal sideleaf end bushing (e.g., a polymer-metal bushing) insertably fitted thereinto.

The first proximal sideleaf end bushing may be configured to receive a first hanger fastener (e.g., fitted insertably thereinto). The first hanger fastener may further be insertably fitted into a first hanger (e.g., one of hangers 274). The first hanger may be in mechanical communication (e.g., attached to, welded to, integral with, bolted to, etc.) a vehicle frame (e.g., one of frame rails 271) of a vehicle (e.g., truck, car, or other type of automobile). Thus, a first proximal sideleaf end pinned connection may be formed between first proximal sideleaf end 211 and the first hanger (e.g., one of hangers 274). Suspension system 270 may further include a mass support system 273, for example a spring-based or air-based mass support system.

The first distal sideleaf end bushing may be configured to receive a first axle bracket fastener (e.g., fitted insertably thereinto). The first axle bracket fastener may further be insertably fitted into a first axle bracket (e.g., one of axle brackets 276). The first axle bracket may be in mechanical communication (e.g., attached to, welded to, integral with, bolted to, etc.) an axle assembly (e.g., one of axle assemblies 272) of the vehicle. Thus, a first distal sideleaf end pinned connection may be formed between first distal sideleaf end 212 and the first axle bracket (e.g., one of axle brackets 276).

Second sideleaf 220 may include a second proximal sideleaf end 221, a second distal sideleaf end 222, and a second sideleaf member 223. Second sideleaf member 223 may extend from second proximal sideleaf end 221 to second distal sideleaf end 222.

Second proximal sideleaf end 221, second distal sideleaf end 222, and second sideleaf member 223 may be monolithic.

Second proximal sideleaf end 221 and second distal sideleaf end 222 may each include a second proximal sideleaf end eye and a second distal sideleaf end eye, respectively.

The second proximal sideleaf end eye may be configured to have a second proximal sideleaf end bushing (e.g., a polymer-metal bushing) insertably fitted thereinto. The second distal sideleaf end eye may be configured to have a second distal sideleaf end bushing (e.g., a polymer-metal bushing) insertably fitted thereinto.

The second proximal sideleaf end bushing may be configured to receive a second hanger fastener (e.g., fitted insertably thereinto). The second hanger fastener may further be insertably fitted into a second hanger (e.g., one of hangers 274). The second hanger may be in mechanical communication (e.g., attached to, welded to, integral with, bolted to, etc.) a vehicle frame (e.g., one of frame rails 271) of a vehicle (e.g., truck, car, or other type of automobile). Thus, a second proximal sideleaf end pinned connection may be formed between second proximal sideleaf end 221 and the second hanger (e.g., one of hangers 274).

The second distal sideleaf end bushing may be configured to receive a second axle bracket fastener (e.g., fitted insertably thereinto). The second axle bracket fastener may further be insertably fitted into a second axle bracket (e.g., one of axle brackets 276). The second axle bracket may be in mechanical communication (e.g., attached to, welded to, integral with, bolted to, etc.) an axle assembly (e.g., one of axle assemblies 272) of the vehicle. Thus, a second distal sideleaf end pinned connection may be formed between second distal sideleaf end 222 and the second axle bracket (e.g., one of axle brackets 276).

Thus, device 200 may provide both wheel/axle movement control and anti-roll functionality for suspension system 270.

FIG. 2C illustrates a sideleaf end 280 as an example. First proximal sideleaf end 211, first distal sideleaf end 212, second proximal sideleaf end 221, and/or second distal sideleaf end 222 may be of similar configurations to sideleaf end 280. Sideleaf end 280 may include a sideleaf end eye 280a. Sideleaf end eye 280a may be configured to have a sideleaf end bushing 281 (e.g., a polymer-metal bushing) insertably fitted thereinto. Sideleaf end bushing 281 may be configured to receive a fastener 291 fitted insertably thereinto (e.g., a hanger fastener or an axle bracket fastener). The fastener may further be insertably fitted into another component (e.g., a hanger (e.g., one of hangers 274) or an axle bracket (e.g., one of axle brackets 276). Thus, a sideleaf end pinned connection may be formed between sideleaf end 280 and another component (e.g., a hanger (e.g., one of hangers 274) or an axle bracket (e.g., one of axle brackets 276).

Sideleaf end 280 may be formed in a variety of manners, including, for example, by hot rolling, cold rolling, or forging. Different manners of forming may be used based on the material used to form sideleaf of sideleaf end 280. Sideleaf end 280 and/or sideleaf end eye 280a may be machined.

Returning to FIGS. 2A-2B, crossleaf 230 may include a proximal crossleaf end 231, a distal crossleaf end 232, and a crossleaf member 233 extending from proximal crossleaf end 231 to distal crossleaf end 232.

Proximal crossleaf end 231 may be mechanically connected to first sideleaf member 213. Distal crossleaf 232 end may be mechanically connected to second sideleaf member 223. In some implementations, proximal crossleaf end 231 may be connected to first sideleaf member 213 and distal crossleaf end 232 may be connected to second sideleaf member 223 via a spring plate (e.g., spring plates 241, 242, respectively). In some other implementations, proximal crossleaf end 231 may be connected to first sideleaf member 213 and distal crossleaf end 232 may be connected to second sideleaf member 223 via a u-bolt. In some other implementations, proximal crossleaf end 231 may be connected to first sideleaf member 213 and distal crossleaf end 232 may be connected to second sideleaf member 223 via a bolt-and-plate connection. In some other implementations, first sideleaf 210, second sideleaf 220, and crossleaf 230 may be monolithic and/or integral.

Proximal crossleaf end 231 may be mechanically connected to first sideleaf member 213 and distal crossleaf end 232 may be mechanically connected to second sideleaf member 223 such that crossleaf 230 may be configured to be detachable from first sideleaf member 213 and/or second sideleaf member 223.

Proximal crossleaf end 231 may be mechanically connected to first sideleaf member 213 and distal crossleaf end 232 may be mechanically connected to second sideleaf member 223 such that a position of proximal crossleaf end 231 and/or distal crossleaf end 232 relative to first sideleaf proximal end 211 and/or second sideleaf proximal end 221, respectively, is adjustable. Adjusting the position of proximal crossleaf end 231 and distal crossleaf end 232 relative to first sideleaf proximal end 211 and second sideleaf proximal end 221, respectively, may adjust a roll stiffness parameter of the device/system/vehicle (e.g., device 200). In this way, such modular construction and bolted-on assembly of H-frame may enable simple variation of roll stiffness (OEM, and even aftermarket) adapted to the vehicle specifications (e.g., high center-of-gravity) and use (e.g., off-road) by replacing the sideleafs and/or crossleaf with softer/stiffer interchangeable versions.

Crossleaf member 230 may be of a variety of shapes, e.g., including having a bend. Crossleaf member 230 may be shaped so as to avoid interferences with axles and drivelines, and for other reasons. For example, in some implementations, crossleaf member 230 may include a bend (e.g., a curved section) such that when device 200 including crossleaf member 230 is installed in a vehicle, crossleaf member does not interfere with another component of the vehicle (e.g., a rear differential).

The sideleaf and/or the crossleaf may comprise a material having a yield strength in a range of 130 ksi to 170 ksi, inclusively (e.g., spring steel, alloy steel, composite materials, titanium).

FIGS. 3A-3D illustrate various configurations of H-frame devices 300a-d. H-frame devices 300a-d may represent some examples of how an H-frame device can be configured, which may be based upon, for example, a vehicle design, a use case, or a type of suspension system. H-frame devices 300a-d illustrate only some implementations, and are in no way limiting on the design or arrangement of H-frame devices of the present disclosure, which is limited only by the appended claims.

Figure 3A:
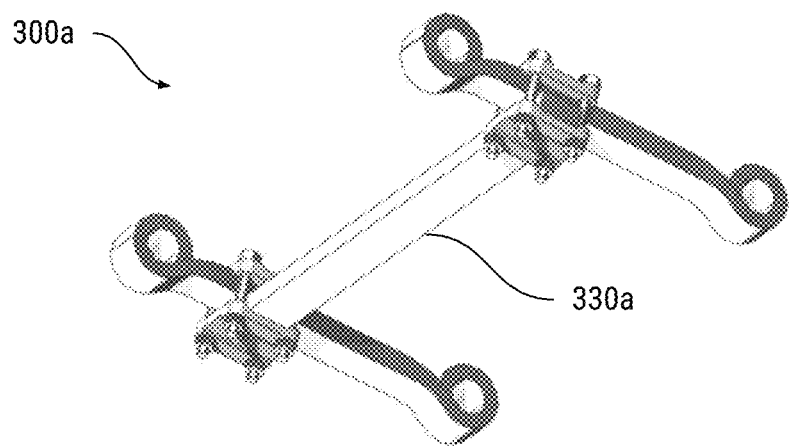
FIGS. 3A-3D illustrate various configurations of H-frame devices.

In the example illustrated in FIG. 3A, H-frame device 300a may include a straight crossleaf 330a. Crossleaf 330a may be provided, for example, in implementations where the suspension, wheel, and drivetrain assemblies of the vehicle would not be expected to interfere with crossleaf 330a.

Figure 3B:
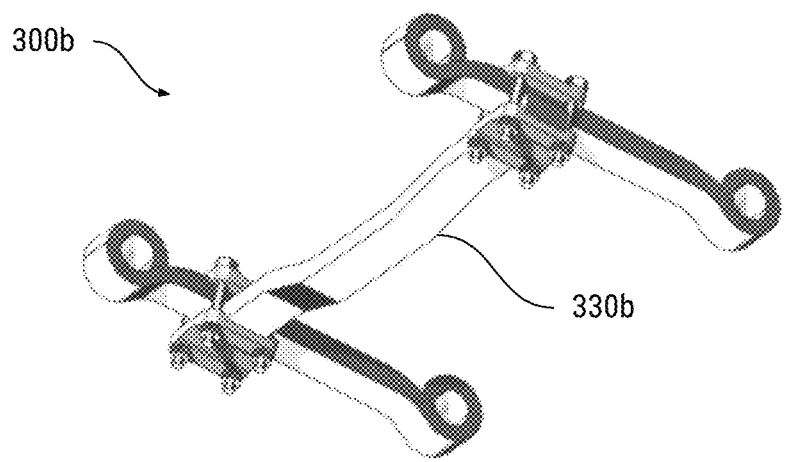

In the example illustrated in FIG. 3B, H-frame device 300b may include a crossleaf 330b having an out-of-plane bend. An out-of-plane bend of crossleaf 330b may include a bend out of the plane generally shared by the sideleaves. Crossleaf 330b may be provided, for example, in implementations where an in-plane crossleaf would interfere with a vehicle component (e.g., of the suspension, wheel, and drivetrain assemblies, etc.). It will be understood that the out-of-plane bend of crossleaf 330b may be configured such that crossleaf 330b may be adjusted in position with respect to the sideleaf ends without causing an interference with another vehicle component.

Figure 3C:
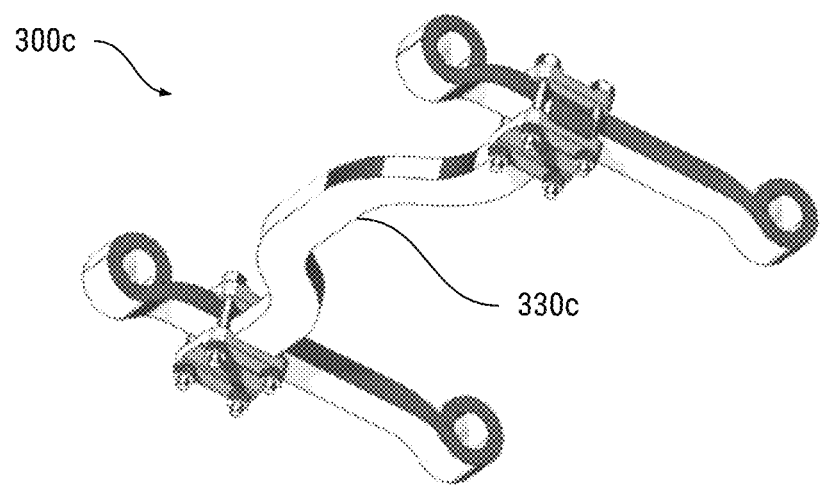

In the example illustrated in FIG. 3C, H-frame device 300c may include a straight crossleaf 330c having an in-plane bend. An in-plane bend of crossleaf 330c may include a bend in the plane generally shared by the sideleaves. Crossleaf 330c may be provided, for example, in implementations where a straight crossleaf would interfere with a vehicle component (e.g., of the suspension, wheel, and drivetrain assemblies, etc.), but an in-plane bend avoids such an interference. It will be understood that the in-plane bend of crossleaf 330c may be configured such that crossleaf 330c may be adjusted in position with respect to the sideleaf ends without causing an interference with another vehicle component. However, such adjustment may be limited to positions not effecting an interference.

It will be further understood that a crossleaf may include a combination of an in-plane and out-of-plane bend, or in-plane and out-of-plane bends.

Figure 3D:
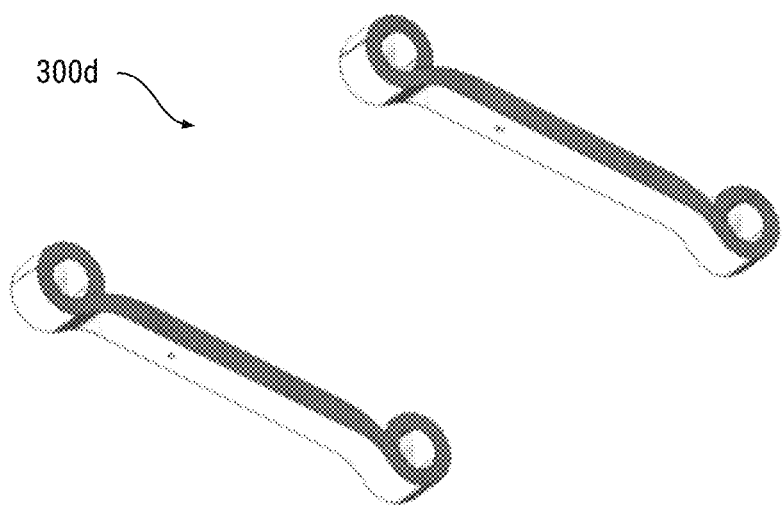

In the example illustrated in FIG. 3D, H-frame device 300d may include no crossleaf. In some implementations where the additional roll stiffness provided by a crossleaf is not required, the sideleaves may provide the requisite roll stiffness for the suspension system. In such implementations, for example, when use of a vehicle is limited to highway use, a crossleaf may be foregone and/or temporarily removed.

Figure 4:
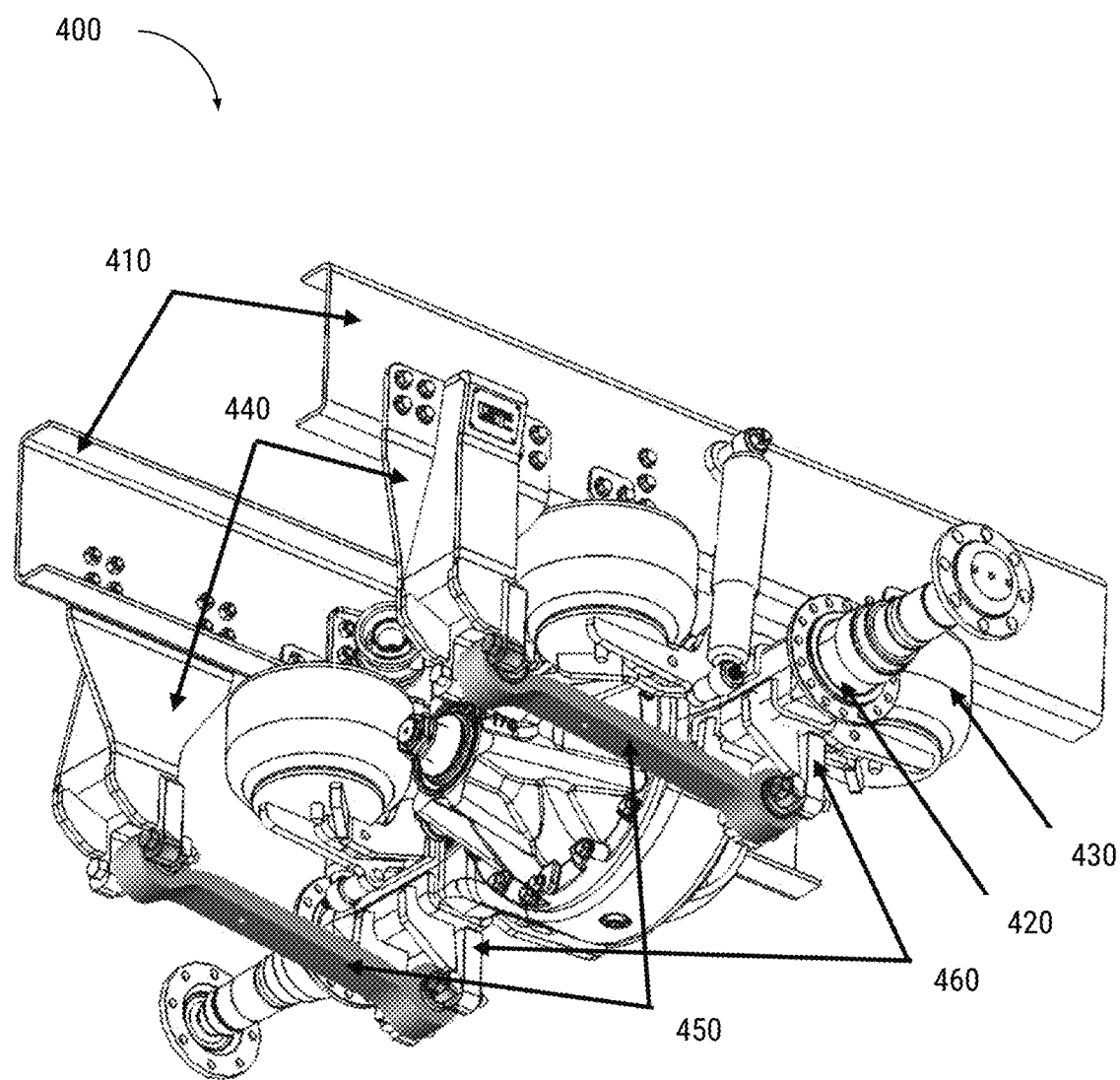
FIG. 4 illustrates a vehicle suspension system including an H-frame device without a crossleaf, according to one or more implementations.

FIG. 4 illustrates a vehicle suspension system 400 including an H-frame device 450 without a crossleaf, according to one or more implementations.

System 400 may, similarly to system 270, include one or more frame rails 410, hangers 440, mass support systems 430, axle(s) 420, and axle brackets 460. However, device 450 is illustrated without having a crossleaf (e.g., such as crossleaf 230). In such an implementation a crossleaf may be removed from device 450 if a type of vehicle and/or use of the vehicle permits. For example, during highway operation, a vehicle may have a lesser requirement for roll stiffness than in operations requiring more banking.

Figure 5:
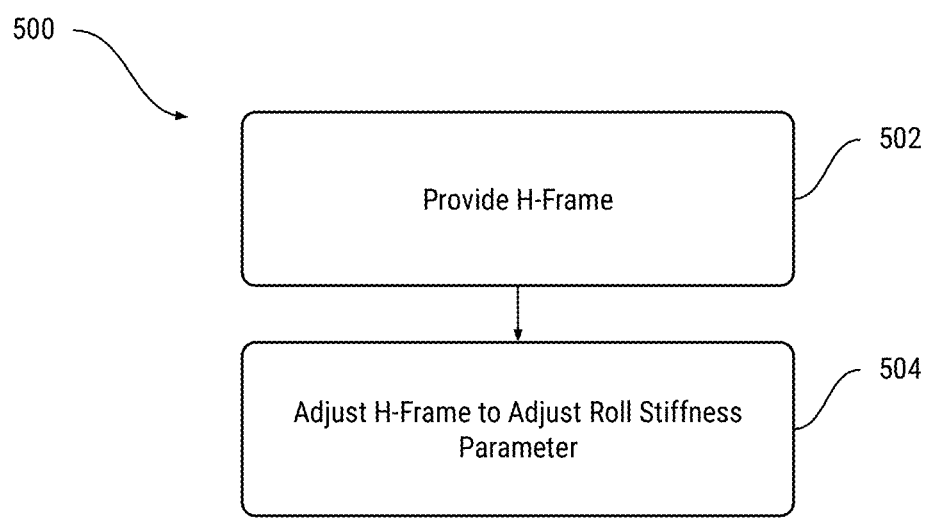
FIG. 5 illustrates a process for adjusting a roll stiffness parameter, according to one or more implementations.

FIG. 5 illustrates a process 500 for adjusting a roll stiffness parameter, according to one or more implementations. Process 500 may be utilized to adjust the roll stiffness of a vehicle employing an H-frame device.

An operation 502 may include the provision of an H-frame device. The H-frame device may be similar to H-frame devices 200, 300a-d, or 450, or other implementations of H-frame devices according to the present disclosure. The H-frame device may be installed within a vehicle's suspension system.

An operation 504 may include the adjustment of the H-frame device to adjust a roll stiffness parameter. The roll stiffness parameter may be adjusted by, for example, removing or loosening a connection of a crossleaf of the H-frame device and adjusting the position of the crossleaf, or removing the crossleaf altogether.

Although FIG. 5 depicts an example process 500 and operations thereof, in some implementations, a process illustrated herein may include additional operations, fewer operations, differently arranged operations, or different operations than the operations depicted in FIG. 5. Moreover, or in the alternative, two or more of the operations depicted in FIG. 5 may be performed at least partially in parallel.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or claim limitation should not be interpreted to invoke 35 U.S.C. § 112(f).

As used herein, satisfying a threshold may, depending on the context, refer to a value being greater than the threshold, greater than or equal to the threshold, less than the threshold, less than or equal to the threshold, equal to the threshold, and/or the like, depending on the context.

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:
1. A suspension system, comprising:
a first hanger in mechanical communication with a vehicle frame of a vehicle and having a first hanger fastener insertably fitted thereinto;
a second hanger in mechanical communication with the vehicle frame and having a second hanger fastener insertably fitted thereinto;
a first axle assembly including a first axle bracket and having a first axle bracket fastener insertably fitted thereinto;
a second axle assembly including a second axle bracket and having a second axle bracket fastener insertably fitted thereinto;
a first sideleaf including a first proximal sideleaf end, a first distal sideleaf end, and a first sideleaf member extending from the first proximal sideleaf end to the first distal sideleaf end, wherein:
the first proximal sideleaf end, the first distal sideleaf end, and the first sideleaf member are monolithic; and
the first proximal sideleaf end and the first distal sideleaf end each include a first proximal sideleaf end eye and a first distal sideleaf end eye, respectively, the first proximal sideleaf end eye and the first distal sideleaf end eye having insertably fitted therein a first proximal sideleaf end bushing and a first distal sideleaf end bushing, respectively;
wherein:
the first hanger fastener is insertably fitted into the first proximal sideleaf end bushing, thereby forming a first proximal sideleaf end pinned connection between the first proximal sideleaf end and the first hanger; and
the first axle bracket fastener is insertably fitted into the first distal sideleaf end bushing, thereby forming a first distal sideleaf end pinned connection between the first distal sideleaf end and the first axle bracket;
a second sideleaf including a second proximal sideleaf end, a second distal sideleaf end, and a second sideleaf member extending from the second proximal sideleaf end to the second distal sideleaf end, wherein:
the second proximal sideleaf end, the second distal sideleaf end, and the second sideleaf member are monolithic; and
the second proximal sideleaf end and the second distal sideleaf end each include a second proximal sideleaf end eye and a second distal sideleaf end eye, respectively, the second proximal sideleaf end eye and the second distal sideleaf end eye having insertably fitted therein a second proximal sideleaf end bushing and a second distal sideleaf end bushing, respectively;
wherein:
the second hanger fastener is insertably fitted into the second proximal sideleaf end bushing, thereby forming a second proximal sideleaf end pinned connection between the second proximal sideleaf end and the second hanger; and
the second axle bracket fastener is insertably fitted into the second distal sideleaf end bushing, thereby forming a second distal sideleaf end pinned connection between the second distal sideleaf end and the second axle bracket; and
a crossleaf including a proximal crossleaf end, a distal crossleaf end, and a crossleaf member extending from the proximal crossleaf end to the distal crossleaf end, wherein the proximal crossleaf end is mechanically connected by a proximal bolted compression connection to the first sideleaf member and the distal crossleaf end is mechanically connected by a distal bolted compression connection to the second sideleaf member such that a position of the proximal crossleaf end and the distal crossleaf end relative to the first sideleaf proximal end and the second sideleaf proximal end, respectively, is adjustable by loosening the proximal bolted compression connection and the bolted distal compression connection, sliding the crossleaf along the first sideleaf and the second sideleaf, and re-tightening the proximal bolted compression connection and the bolted distal compression connection.

2. The system of claim 1, wherein the first sideleaf, the second sideleaf, and the crossleaf comprise spring steel, alloy steel, a composite material, or titanium.

3. The system of claim 1, wherein the first sideleaf, the second sideleaf, and the crossleaf comprise a material having a yield strength in a range of 130 ksi to 170 ksi, inclusively.

4. The system of claim 1, wherein:
the proximal crossleaf end is mechanically connected to the first sideleaf member via a spring plate or a u-bolt; and
the distal crossleaf end is mechanically connected to the second sideleaf member via a spring plate or a u-bolt.

5. The system of claim 1, wherein the proximal crossleaf end is mechanically connected to the first sideleaf member and the distal crossleaf end is mechanically connected to the second sideleaf member such that the crossleaf is configured to be detachable from the first sideleaf member and the second sideleaf member.

6. The system of claim 1, wherein adjusting the position of the proximal crossleaf end and the distal crossleaf end relative to the first sideleaf proximal end and the second sideleaf proximal end, respectively, adjusts a roll stiffness parameter of the system.

7. The system of claim 1, wherein the first proximal sideleaf end bushing, the first distal sideleaf end bushing, the second proximal sideleaf end bushing, and the second distal sideleaf end bushing are polymer-metal bushings.

8. A device, comprising:
a first sideleaf including a first proximal sideleaf end, a first distal sideleaf end, and a first sideleaf member extending from the first proximal sideleaf end to the first distal sideleaf end, wherein:
the first proximal sideleaf end, the first distal sideleaf end, and the first sideleaf member are monolithic; and
the first proximal sideleaf end and the first distal sideleaf end each include a first proximal sideleaf end eye and a first distal sideleaf end eye, respectively, the first proximal sideleaf end eye configured to have a first proximal sideleaf end bushing insertably fitted thereinto and the first distal sideleaf end eye configured to have a first distal sideleaf end bushing insertably fitted thereinto, wherein:
the first proximal sideleaf end bushing is configured to receive a first hanger fastener fitted insertably thereinto, the first hanger fastener further being insertably fitted into a first hanger in mechanical communication with a vehicle frame of a vehicle, thereby forming a first proximal sideleaf end pinned connection between the first proximal sideleaf end and the first hanger; and
the first distal sideleaf end bushing is configured to receive a first axle bracket fastener fitted insertably thereinto, the first axle bracket fastener further being insertably fitted into a first axle bracket of a first axle assembly, thereby forming a first distal sideleaf end pinned connection between the first distal sideleaf end and the first axle bracket;
a second sideleaf including a second proximal sideleaf end, a second distal sideleaf end, and a second sideleaf member extending from the second proximal sideleaf end to the second distal sideleaf end, wherein:
the second proximal sideleaf end, the second distal sideleaf end, and the second sideleaf member are monolithic; and
the second proximal sideleaf end and the second distal sideleaf end each include a second proximal sideleaf end eye and a second distal sideleaf end eye, respectively, the second proximal sideleaf end eye configured to have a second proximal sideleaf end bushing insertably fitted thereinto and the second distal sideleaf end eye configured to have a second distal sideleaf end bushing insertably fitted thereinto, wherein:
the second proximal sideleaf end bushing is configured to receive a second hanger fastener fitted insertably thereinto, the second hanger fastener further being insertably fitted into a second hanger in mechanical communication with the vehicle frame, thereby forming a second proximal sideleaf end pinned connection between the second proximal sideleaf end and the second hanger; and
the second distal sideleaf end bushing is configured to receive a second axle bracket fastener fitted insertably thereinto, the second axle bracket fastener further being insertably fitted into a second axle bracket of a second axle assembly, thereby forming a second distal sideleaf end pinned connection between the second distal sideleaf end and the second axle bracket; and
a crossleaf including a proximal crossleaf end, a distal crossleaf end, and a crossleaf member extending from the proximal crossleaf end to the distal crossleaf end, wherein the proximal crossleaf end is mechanically connected by a proximal bolted compression connection to the first sideleaf member and the distal crossleaf end is mechanically connected by a distal bolted compression connection to the second sideleaf member such that a position of the proximal crossleaf end and the distal crossleaf end relative to the first sideleaf proximal end and the second sideleaf proximal end, respectively, is adjustable by loosening the proximal bolted compression connection and the bolted distal compression connection, sliding the crossleaf along the first sideleaf and the second sideleaf, and re-tightening the proximal bolted compression connection and the bolted distal compression connection.

9. The device of claim 8, wherein the crossleaf member includes a bend of an entire profile of the crossleaf member.

10. The device of claim 8, wherein the proximal crossleaf end is mechanically connected to the first sideleaf member and the distal crossleaf end is mechanically connected to the second sideleaf member via a bolt-and-plate connection or via a u-bolt connection.

11. The device of claim 8, wherein the proximal crossleaf end is mechanically connected to the first sideleaf member and the distal crossleaf end is mechanically connected to the second sideleaf member such that the crossleaf is configured to be detachable from the first sideleaf member and the second sideleaf member.

12. A device, comprising:
a first sideleaf including a first proximal sideleaf end, a first distal sideleaf end, and a first sideleaf member extending from the first proximal sideleaf end to the first distal sideleaf end, wherein:
the first proximal sideleaf end, the first distal sideleaf end, and the first sideleaf member are monolithic; and
the first proximal sideleaf end and the first distal sideleaf end each include a first proximal sideleaf end eye and a first distal sideleaf end eye, respectively; and a second sideleaf including a second proximal sideleaf end, a second distal sideleaf end, and a second sideleaf member extending from the second proximal sideleaf end to the second distal sideleaf end, wherein:

the second proximal sideleaf end, the second distal sideleaf end, and the second sideleaf member are monolithic; and the second proximal sideleaf end and the second distal sideleaf end each include a second proximal sideleaf end eye and a second distal sideleaf end eye, respectively; and a crossleaf including a proximal crossleaf end, a distal crossleaf end, and a crossleaf member extending from the proximal crossleaf end to the distal crossleaf end wherein the proximal crossleaf end is mechanically connected by a proximal bolted compression connection to the first sideleaf member and the distal crossleaf end is mechanically connected by a distal bolted compression connection to the second sideleaf member such that a position of the proximal crossleaf end and the distal crossleaf end relative to the first sideleaf proximal end and the second sideleaf proximal end, respectively, is adjustable by loosening the proximal bolted compression connection and the bolted distal compression connection, sliding the crossleaf along the first sideleaf and the second sideleaf, and re-tightening the proximal bolted compression connection and the bolted distal compression connection.

13. The device of claim 12, wherein the proximal crossleaf end is mechanically connected to the first sideleaf member and the distal crossleaf end is mechanically connected to the second sideleaf member such that the crossleaf is configured to be detachable from the first sideleaf member and the second sideleaf member.

14. The device of claim 12, wherein adjusting the position of the proximal crossleaf end and the distal crossleaf end relative to the first sideleaf proximal end and the second sideleaf proximal end, respectively, adjusts a roll stiffness parameter of the device.

15. The device of claim 12, wherein:

the first proximal sideleaf end eye is configured to have a first proximal sideleaf end bushing insertably fitted thereinto and the first distal sideleaf end eye configured to have a first distal sideleaf end bushing insertably fitted thereinto; and the second proximal sideleaf end eye configured to have a second proximal sideleaf end bushing insertably fitted thereinto and the second distal sideleaf end eye configured to have a second distal sideleaf end bushing insertably fitted thereinto.

16. The device of claim 15, wherein:

the first proximal sideleaf end bushing is configured to receive a first hanger fastener fitted insertably thereinto, the first hanger fastener further being insertably fitted into a first hanger in mechanical communication with a vehicle frame of a vehicle, thereby forming a first proximal sideleaf end pinned connection between the first proximal sideleaf end and the first hanger;

the first distal sideleaf end bushing is configured to receive a first axle bracket fastener fitted insertably thereinto, the first axle bracket fastener further being insertably fitted into a first axle bracket of a first axle assembly, thereby forming a first distal sideleaf end pinned connection between the first distal sideleaf end and the first axle bracket;

the second proximal sideleaf end bushing is configured to receive a second hanger fastener fitted insertably thereinto, the second hanger fastener further being insertably fitted into a second hanger in mechanical communication with the vehicle frame, thereby forming a second proximal sideleaf end pinned connection between the second proximal sideleaf end and the second hanger; and the second distal sideleaf end bushing is configured to receive a second axle bracket fastener fitted insertably thereinto, the second axle bracket fastener further being insertably fitted into a second axle bracket of a second axle assembly, thereby forming a second distal sideleaf end pinned connection between the second distal sideleaf end and the second axle bracket.

* * * * *